(12) United States Patent
Molander et al.

(10) Patent No.: US 9,329,773 B2
(45) Date of Patent: May 3, 2016

(54) SCALABLE GESTURE-BASED DEVICE CONTROL

(75) Inventors: Mark Molander, Research Triangle Park, NC (US); William G. Pagan, Research Triangle Park, NC (US); Devon Snyder, Research Triangle Park, NC (US); Patrick Bohrer, Austin, TX (US); Todd Eischeid, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 13/111,470

(22) Filed: May 19, 2011

(65) Prior Publication Data

US 2012/0297326 A1    Nov. 22, 2012

(51) Int. Cl.
| | | |
|---|---|---|
| *G06F 3/048* | (2013.01) | |
| *G06F 3/0488* | (2013.01) | |
| *G06F 3/0484* | (2013.01) | |
| *G05B 19/409* | (2006.01) | |

(52) U.S. Cl.
CPC .......... *G06F 3/04883* (2013.01); *G06F 3/0484* (2013.01); *G06F 3/0488* (2013.01); *G06F 3/04847* (2013.01); *G06F 3/04886* (2013.01); *G05B 19/409* (2013.01); *G06F 2203/04808* (2013.01)

(58) Field of Classification Search
CPC . G06F 3/0488; G06F 3/0484; G06F 3/04886; G06F 3/04883; G06F 3/04847; G05B 19/409
USPC ......................................................... 715/765
See application file for complete search history.

(56) References Cited

U.S. PATENT DOCUMENTS

| | | | | |
|---|---|---|---|---|
| 5,825,352 A | * | 10/1998 | Bisset ..................... | G06F 3/044 |
| | | | | 345/157 |
| 5,864,105 A | * | 1/1999 | Andrews ........................ | 200/5 R |
| 6,025,834 A | * | 2/2000 | Yamashita et al. ............ | 345/173 |
| 6,157,372 A | * | 12/2000 | Blackburn et al. ............ | 345/173 |
| 6,396,523 B1 | * | 5/2002 | Segal et al. .................... | 715/863 |
| 8,622,294 B1 | * | 1/2014 | Meyers ................ | G06Q 10/083 |
| | | | | 235/375 |
| 9,030,419 B1 | * | 5/2015 | Freed ..................... | G06F 3/0416 |
| | | | | 345/156 |
| 2005/0195075 A1 | * | 9/2005 | McGraw et al. ............... | 340/500 |
| 2008/0036743 A1 | * | 2/2008 | Westerman ............. | G06F 3/038 |
| | | | | 345/173 |
| 2008/0059626 A1 | * | 3/2008 | Campbell et al. ............. | 709/224 |
| 2008/0120567 A1 | * | 5/2008 | Karstens ........................ | 715/772 |
| 2008/0165140 A1 | * | 7/2008 | Christie .............. | G06F 3/04883 |
| | | | | 345/173 |
| 2008/0238879 A1 | * | 10/2008 | Jaeger et al. ................... | 345/173 |
| 2008/0313539 A1 | * | 12/2008 | McClelland et al. ......... | 715/705 |
| 2008/0316183 A1 | | 12/2008 | Westerman et al. | |
| 2009/0199130 A1 | | 8/2009 | Tsern et al. | |
| 2010/0013676 A1 | * | 1/2010 | Do et al. ......................... | 341/20 |

(Continued)

FOREIGN PATENT DOCUMENTS

WO    WO2010/130790    11/2010

*Primary Examiner* — Patrick Riegler
(74) *Attorney, Agent, or Firm* — Suiter Swantz pc llo

(57) ABSTRACT

A method for providing control signals may include, but is not limited to: detecting a first user input associated with at least one graphical user interface element; transmitting one or more control signals associated with the at least one graphical user interface element in response to the first user input; detecting a second user input associated with a grouping of two or more graphical user interface elements; and transmitting one or more control signals associated with the grouping of two or more graphical user interface elements in response to the second user input.

20 Claims, 16 Drawing Sheets

(56) References Cited

U.S. PATENT DOCUMENTS

| | | | |
|---|---|---|---|
| 2010/0083111 A1* | 4/2010 | de los Reyes | G06F 3/0482 715/702 |
| 2010/0088641 A1 | 4/2010 | Choi | |
| 2010/0090971 A1* | 4/2010 | Choi et al. | 345/173 |
| 2010/0149096 A1* | 6/2010 | Migos et al. | 345/158 |
| 2010/0293500 A1 | 11/2010 | Cragun et al. | |
| 2010/0312366 A1* | 12/2010 | Madonna et al. | 700/90 |
| 2011/0072373 A1* | 3/2011 | Yuki | 715/764 |
| 2011/0175816 A1* | 7/2011 | Shin | G06F 3/04883 345/168 |
| 2011/0267277 A1* | 11/2011 | Balch et al. | 345/169 |
| 2011/0296324 A1* | 12/2011 | Goossens | G06Q 10/10 715/763 |
| 2012/0011437 A1* | 1/2012 | James | G06F 1/1643 715/702 |
| 2012/0013540 A1* | 1/2012 | Hogan | 345/173 |
| 2012/0131458 A1* | 5/2012 | Hayes | 715/716 |
| 2012/0166470 A1* | 6/2012 | Baumgaertel et al. | 707/769 |

\* cited by examiner

SCALABLE GESTURE-BASED DEVICE CONTROL

CROSS-REFERENCE TO RELATED APPLICATIONS

The present application is related to the following listed application(s) (the "Related Applications").

RELATED APPLICATIONS

The present application relates to U.S. patent application Ser. No. 13/111,331, entitled GESTURE-BASED NAVIGATION CONTROL, naming Mark Molander, William Pagan, Devon Snyder and Todd Eischeid as inventors, filed May 19, 2011.

All subject matter of the Related Applications is incorporated herein by reference to the extent such subject matter is not inconsistent herewith.

BACKGROUND

Gesturing is a quickly emerging user interface (UI) input mechanism. Such inputs may be applicable to various devices that include touch screen-based UIs employed by touch-sensitive devices (e.g. hand-held/mobile devices such as touch-screen enabled smart phones and tablet computers, large mounted displays, and the like).

SUMMARY

Control signals may provided by: detecting a first user input associated with at least one graphical user interface element; transmitting one or more control signals associated with the at least one graphical user interface element in response to the first user input; detecting a second user input associated with a grouping of two or more graphical user interface elements; and transmitting one or more control signals associated with the grouping of two or more graphical user interface elements in response to the second user input.

DETAILED DESCRIPTION

Figure 1:
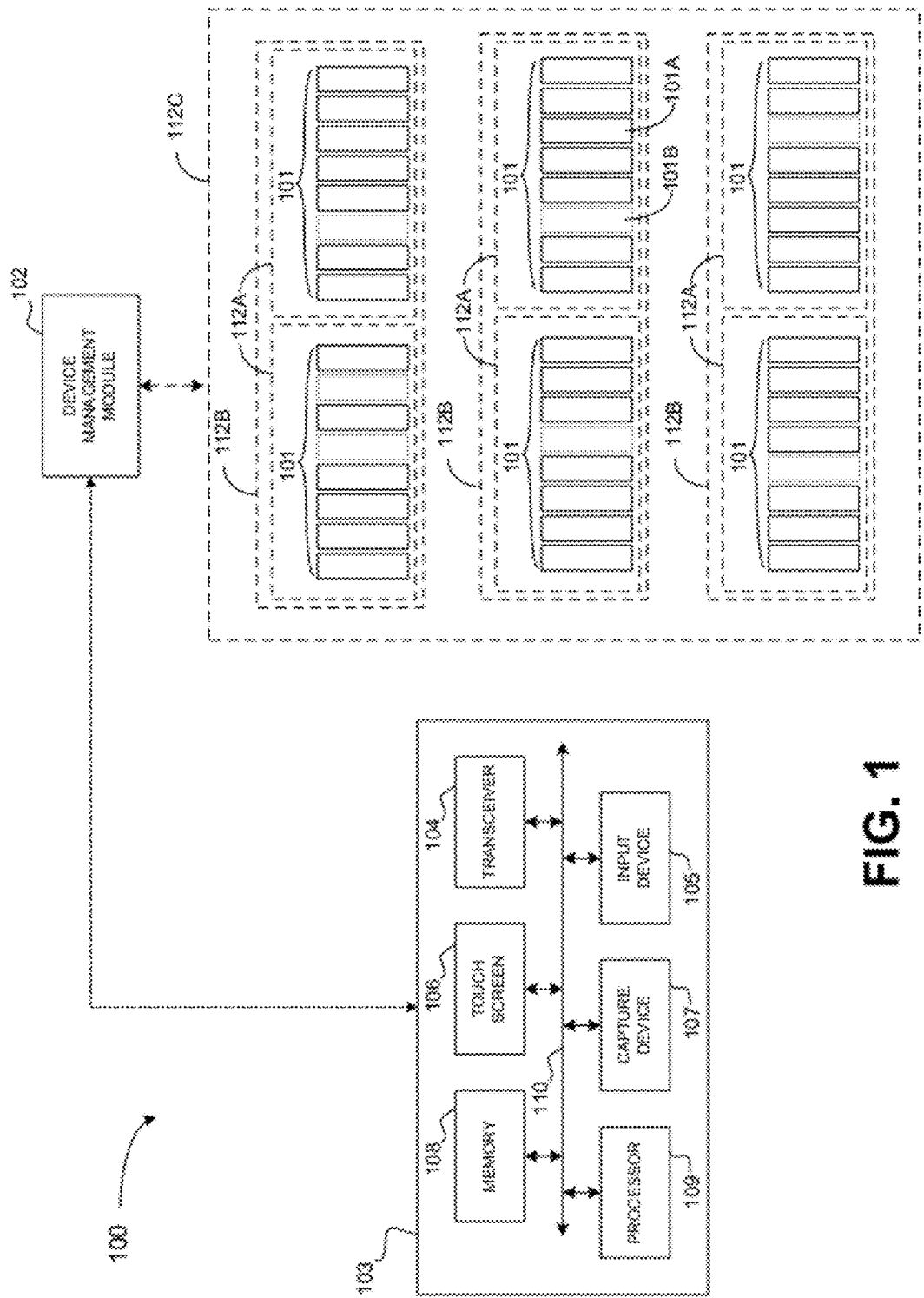
FIG. 1 depicts a system for providing control signals.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present invention is directed to systems and methods that provide for scalable gesture-based user inputs to devices such as touch and multi-touch input devices.

FIG. 1 depicts an exemplary system 100 for monitoring and/or controlling one or more controllable devices 101 (e.g. server, storage, or networking nodes in a data center, audio/video equipment, etc.). At least in the illustrated embodiment, system 100 includes a device management module 102 configured to control at least one controllable device 101. The device management module 102 may be external to or included as a portion of a controllable device 101. The system 100 may further include a gesture-based input device 103 (e.g. a touch-screen enabled tablet computer, smart phone, and the like) in communication with the device management module 102.

The gesture-based input device 103 may include a transceiver 104, one or more input devices 105, a touch-sensitive screen 106, one or more capture devices 107, a memory 108, and a processor 109 coupled to one another via a bus 110 (e.g., a wired and/or wireless bus).

The transceiver 104 may be any system and/or device capable of communicating (e.g., transmitting and receiving data and/or signals) with device management module 102. The transceiver 104 may be operatively connected to device management module 102 via a wireless (e.g. Wi-Fi, Bluetooth, cellular data connections, etc.) or wired (Ethernet, etc.) connection.

The one or more input devices 105 may be any system and/or device capable of receiving input from a user. Examples of input devices 105 include, but are not limited to, a mouse, a key board, a microphone, a selection button, and the like input devices. In various embodiments, each input device 105 is in communication with touch-sensitive screen 106. In other embodiments, touch-sensitive screen 106 is itself, an input device 105.

In various embodiments, the touch-sensitive screen 106 may be configured to display data received from controllable devices 101, device management module 102, input devices 105, one or more capture devices 107, etc.

The capture devices 107 may be any system and/or device capable of capturing environmental inputs (e.g., visual inputs, audio inputs, tactile inputs, etc.). Examples of capture devices 107 include, but are not limited to, a camera, a microphone, a global positioning system (GPS), a gyroscope, a plurality of accelerometers, and the like.

The memory 108 may be any system and/or device capable of storing data. In one embodiment, memory 108 stores computer code that, when executed by processor 109, causes processor 109 to perform a method for controlling one or more controllable devices 101.

The gesture-based input device 103 may provide device control signals 111 to the controllable devices 101 according to one or more user inputs detected by the gesture-based input device 103 that are associated with an controllable device UI element 114 of the UI 113 that is associated with a controllable device 101 (e.g. a graphical or textual representation of a controllable device 101 displayed by the UI 113).

Referring again to FIG. 1, the system 100 may include multiple controllable devices 101 configured in a hierarchical distribution where various controllable devices 101 are grouped (e.g. physically grouped, logically grouped, etc.) according to a defined network distribution scheme. For example, individual controllable devices 101 (e.g. server devices) may be grouped to form a first hierarchical grouping level (e.g. a server chassis group 112A). Further, two or more members of the first hierarchical grouping level may be grouped to form a second hierarchical grouping level (e.g. a server rack/cluster group 112B). Still further, one or more members of the second hierarchical grouping level may be grouped to from a third hierarchical grouping level (e.g. a system or data center group 112C)

Referring to FIGS. 2 and 4-11, the gesture-based input device 103 may be configured (e.g. running software and/or firmware; employing application specific circuitry) to display a UI 113 under the touch-sensitive screen 106 and receive user inputs associated with the UI 113 to provide control signals to one or more controllable devices 101.

Figure 2:
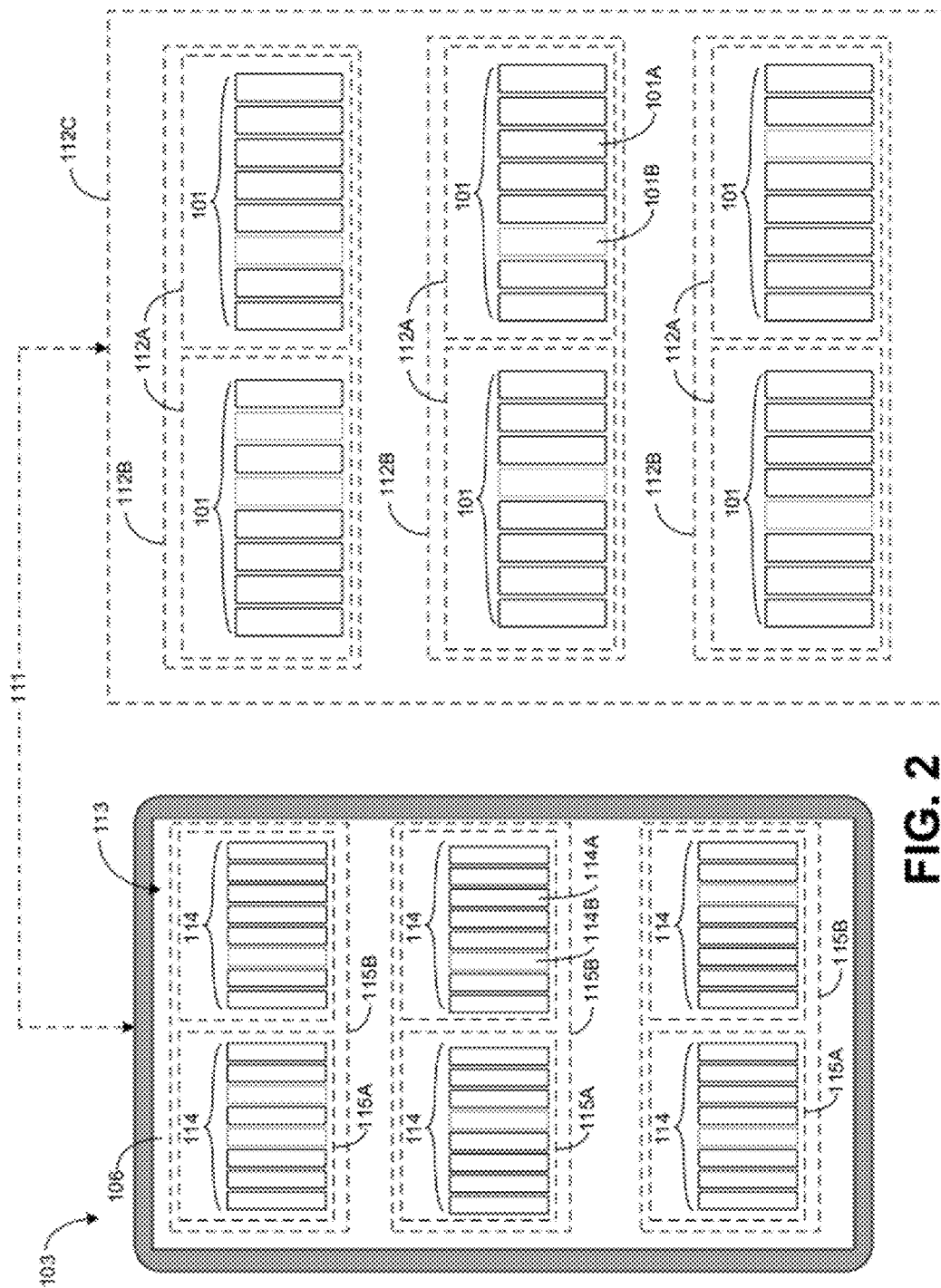
FIG. 2 depicts a system for providing control signals.

For example, as shown in FIG. 2, a UI 113 may be provided on the gesture-based input device 103 that is associated with a status (e.g. the power status) of one or more controllable devices 101 (e.g. server system components). The UI 113 may display one or more controllable device UI elements 114 associated with controllable devices 101. Each controllable device UI element 114 may graphically depict a device status parameter (e.g. a power status) of a controllable device 101 associated with a given controllable device UI element 114. For example, a controllable device UI element 114A in a first state (e.g. in an illuminated state) may be indicative of a controllable device 101A device that is currently powered on. A controllable device UI element 114B in a second state (e.g. in a non-illuminated state) may be indicative of a controllable device 101B that is currently powered off.

Further, the UI 113 may be configured to display a graphical representation of a hierarchical distribution assigned to associated controllable devices 101. For example, the UI 113 may display controllable device UI elements 114 where each controllable device UI element 114 corresponds to a controllable device 101. Further, the UI 113 may display groupings of controllable device UI elements 114 (e.g. a UI element group 115A) associated with the first hierarchical grouping of controllable devices 101 (e.g. the server chassis group 112A), groupings of controllable device UI elements 114 (e.g. a UI element group 115B) associated with the second hierarchical grouping level (e.g. a server rack/cluster group 112B), groupings of controllable device UI elements 114 (e.g. a UI element group 115C) associated with the third hierarchical grouping level (e.g. a system group 112C), and so on.

It may be desirable to manage control operations (e.g. power-related operations) of the one or more controllable devices 101 via the UI 113 presented on the gesture-based input device 103.

Figure 3:
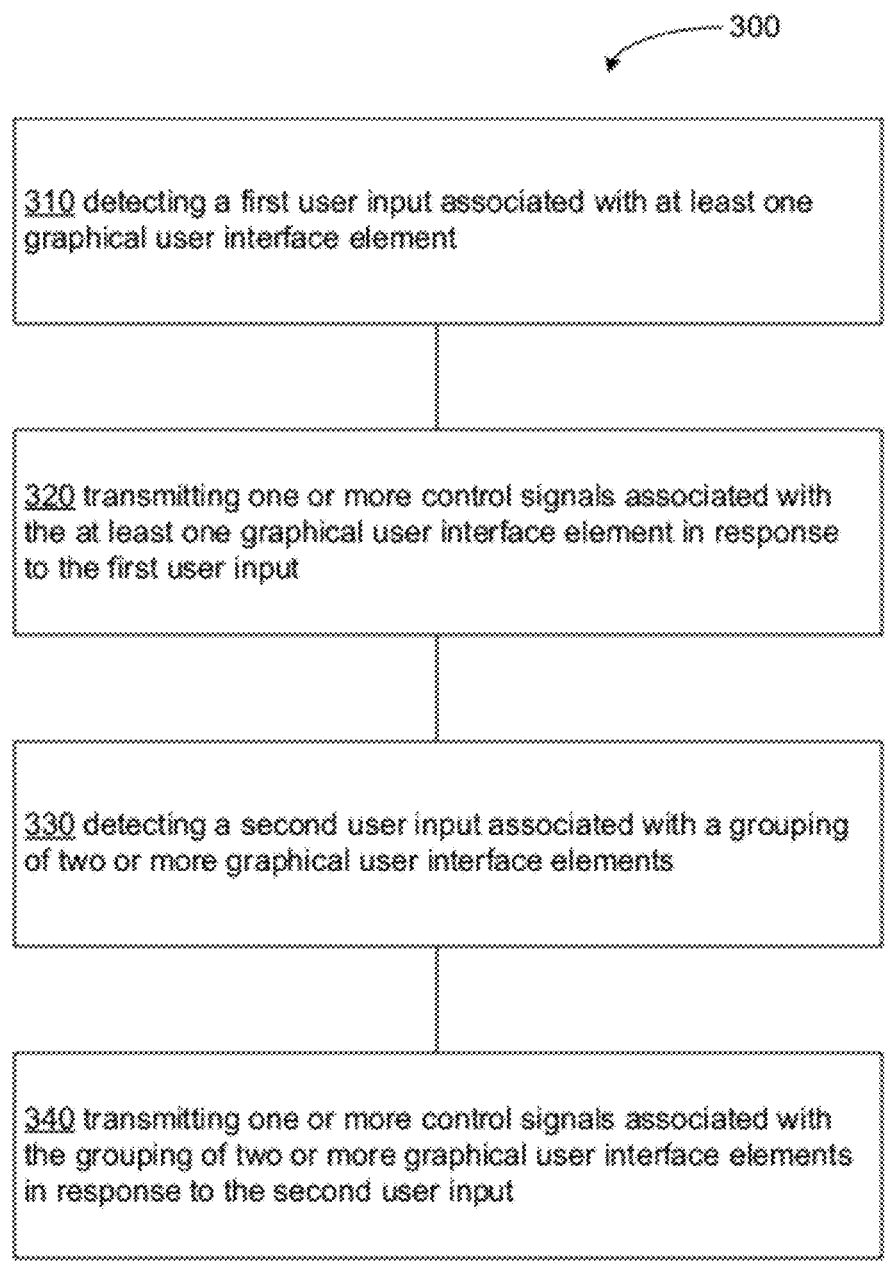
FIG. 3 depicts a method for providing control signals.

FIG. 3 illustrates an operational flow 300 representing example operations related to control operations for a controllable device 101 initiated by a gesture-based input device 103. In FIG. 3, discussion and explanation may be provided with respect to the above-described examples of FIGS. 1-2, and/or with respect to other examples and contexts. However, it should be understood that the operational flows may be executed in a number of other environments and contexts, and/or in modified versions of FIGS. 1-2. In addition, although the various operational flows are presented in the sequence(s) illustrated, it should be understood that the various operations may be performed in other orders than those that are illustrated, or may be performed concurrently.

Figure 4:
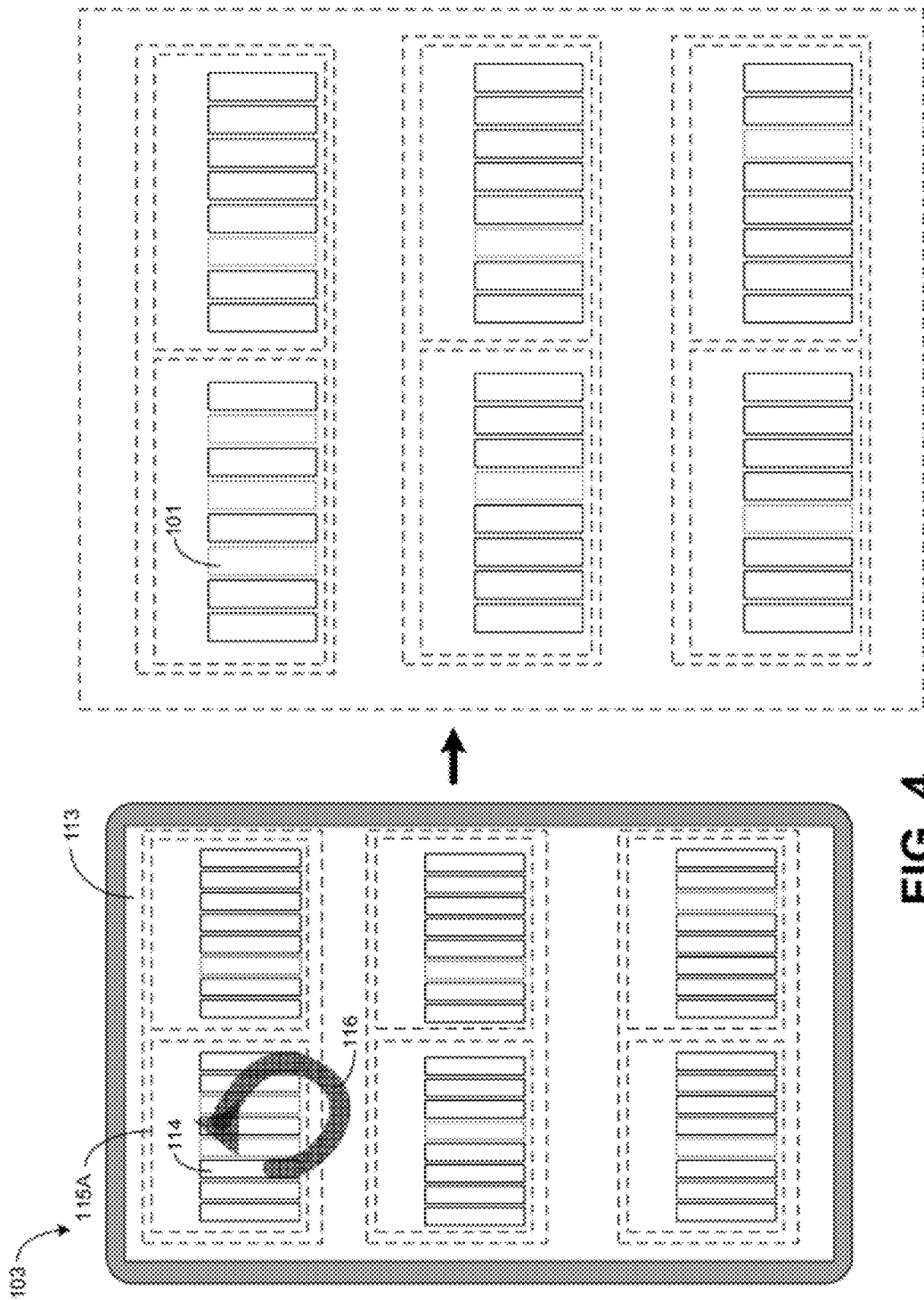
FIG. 4 depicts a user interface for detecting user inputs associated with control signals.

Operation 310 illustrates detecting a first user input associated with at least one graphical user interface element. For example, as shown in FIG. 4, the gesture-based input device 103 may receive a single-touch user input 116 (e.g. a user touch applied to a surface of a touch-sensitive screen 106 of the gesture-based input device 103 at only one distinct region of the surface of the touch-sensitive screen 106 at a given time) associated with a particular controllable device UI element 114 (e.g. an initial user touch to the touch-sensitive screen 106 corresponds to a location on the UI 113 where a controllable device UI element 114 is displayed). The single-touch user input 116 may be characterized by an at least substantially constant application of pressure (e.g. at no point does the user remove their finger from the surface entirely). Further, the user input 116 may be an at least partially dynamic user input (e.g. upon touching the touch-sensitive screen 106 at a location substantially proximate to a controllable device UI element 114, a user may move their finger across the touch-sensitive screen 106 in one or more directions such as shown by the tracing of a single-touch user input 116).

Operation 320 illustrates transmitting one or more control signals associated with the at least one graphical user interface element in response to the first user input. For example, upon receipt of the single-touch user input 116 associated with controllable device UI element 114, the gesture-based input device 103 may provide one or more control signals 111 to a controllable device 101. The one or more one or more control signals 111 may cause the controllable device 101 to perform one or more operations. As shown in FIG. 4, the control signals 111 may cause the controllable device 101 to power off. The control signals 111 may cause the controllable device 101 to perform any number of operations including, but not limited to, powering on; power off; restarting; entering a sleep state; exiting a sleep state; throttling down; and throttling up; and the like.

Figure 5:
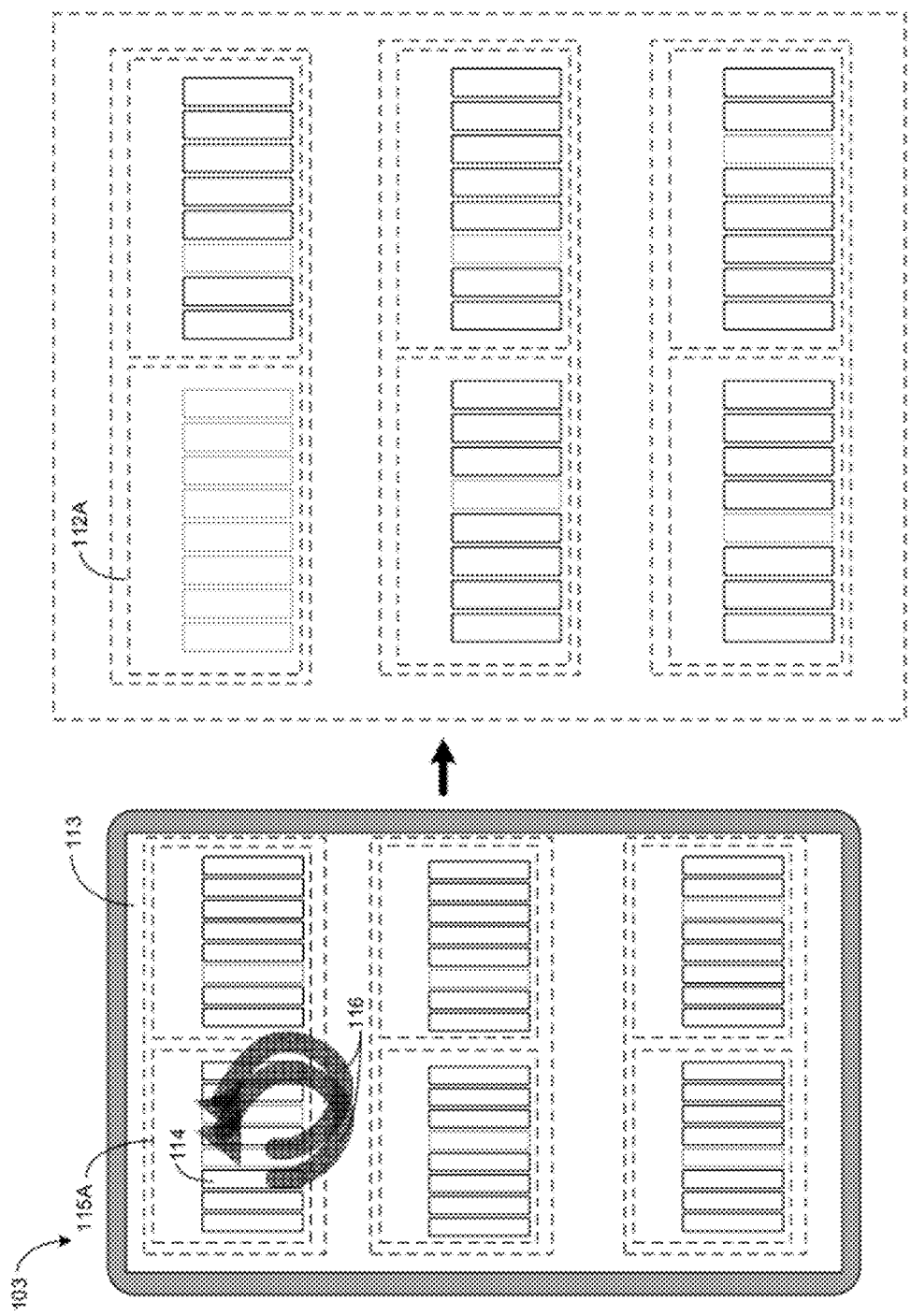
FIG. 5 depicts a user interface for detecting user inputs associated with control signals.

Operation 330 illustrates detecting a second user input associated with a grouping of two or more graphical user interface elements. For example, as shown in FIG. 5, the gesture-based input device 103 may receive a multi-touch user input 116 (e.g. a user touch applied to a surface of a touch-sensitive screen 106 of the gesture-based input device 103 at two or more distinct regions of the surface of the touch-sensitive screen 106 at a given time) associated with a grouping of two or more controllable device UI elements 114 (e.g. an initial user touch to the touch-sensitive screen 106 corresponds to a location on the UI 113 where a UI element group 115A displayed). The multi-touch user input 116 may be characterized by an at least substantially constant application of pressure by two or more fingers (e.g. at no point does the user remove their fingers from the surface entirely). Further, the multi-touch user input 116 may be an at least partially dynamic user input (e.g. upon touching the touch-sensitive screen 106 at a location substantially proximate to a UI element group 115A, a user may move their finger across the touch-sensitive screen 106 in one or more directions such as shown by the tracing of a multi-touch user input 116).

Operation 340 illustrates transmitting one or more control signals associated with the grouping of two or more graphical user interface elements in response to the second user input. For example, upon receipt of the multi-touch user input 116 associated with UI element group 115A, the gesture-based input device 103 may provide one or more control signals 111 to multiple controllable devices 101. The one or more one or more control signals 111 may cause the controllable devices 101 to all perform one or more analogous operations. For example, as shown in FIG. 5, the control signals 111 may cause all controllable devices 101 associated with the UI element group 115A (e.g. all controllable devices 101 within the server chassis group 112A) to power off. The control signals 111 may cause the controllable devices 101 associated with the UI element group 115A to perform any number of operations including, but not limited to, powering on; power off; restarting; entering a sleep state; exiting a sleep state; throttling down; and throttling up; and the like.

Figure 6:
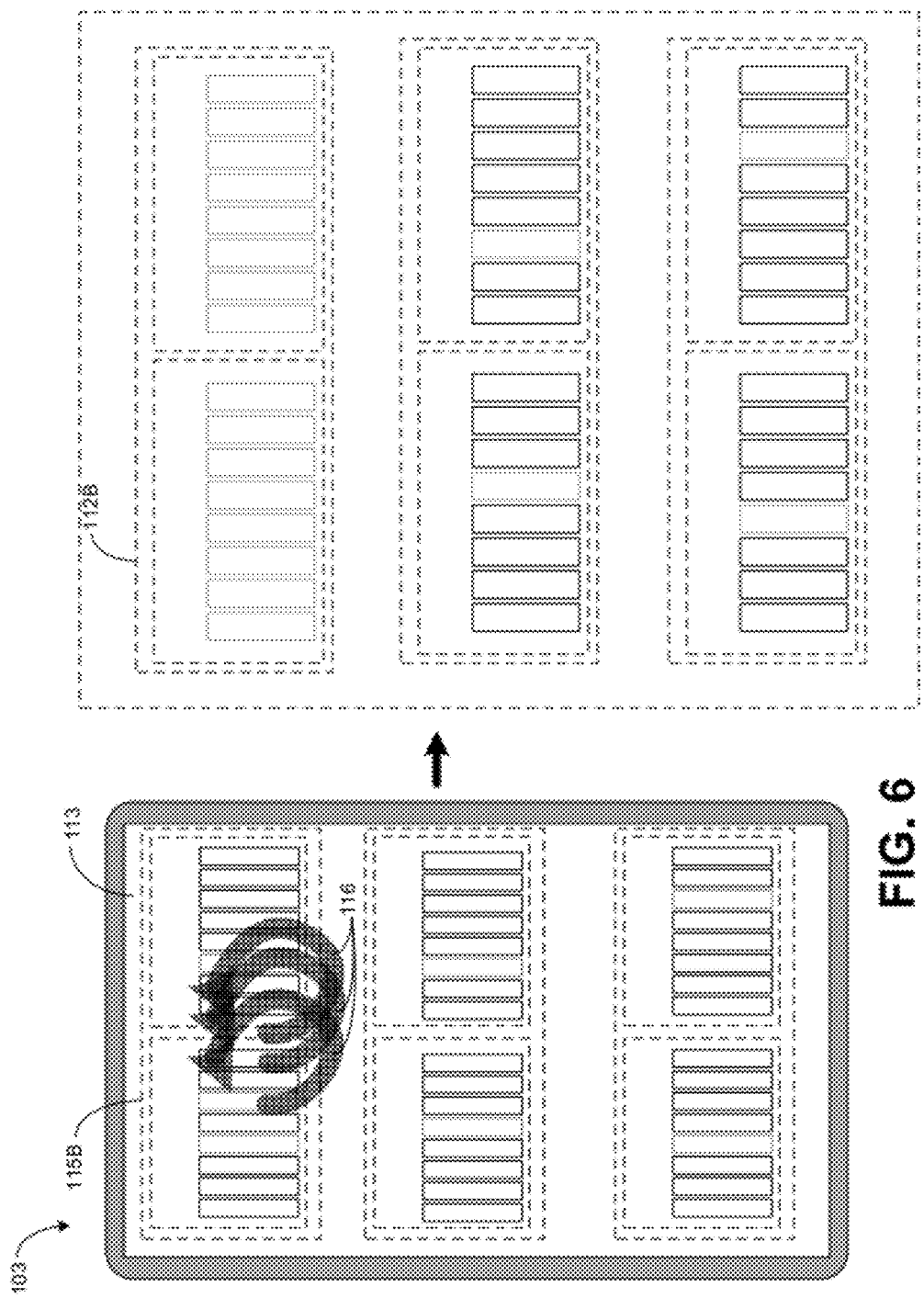
FIG. 6 depicts a user interface for detecting user inputs associated with control signals.
Figure 7:
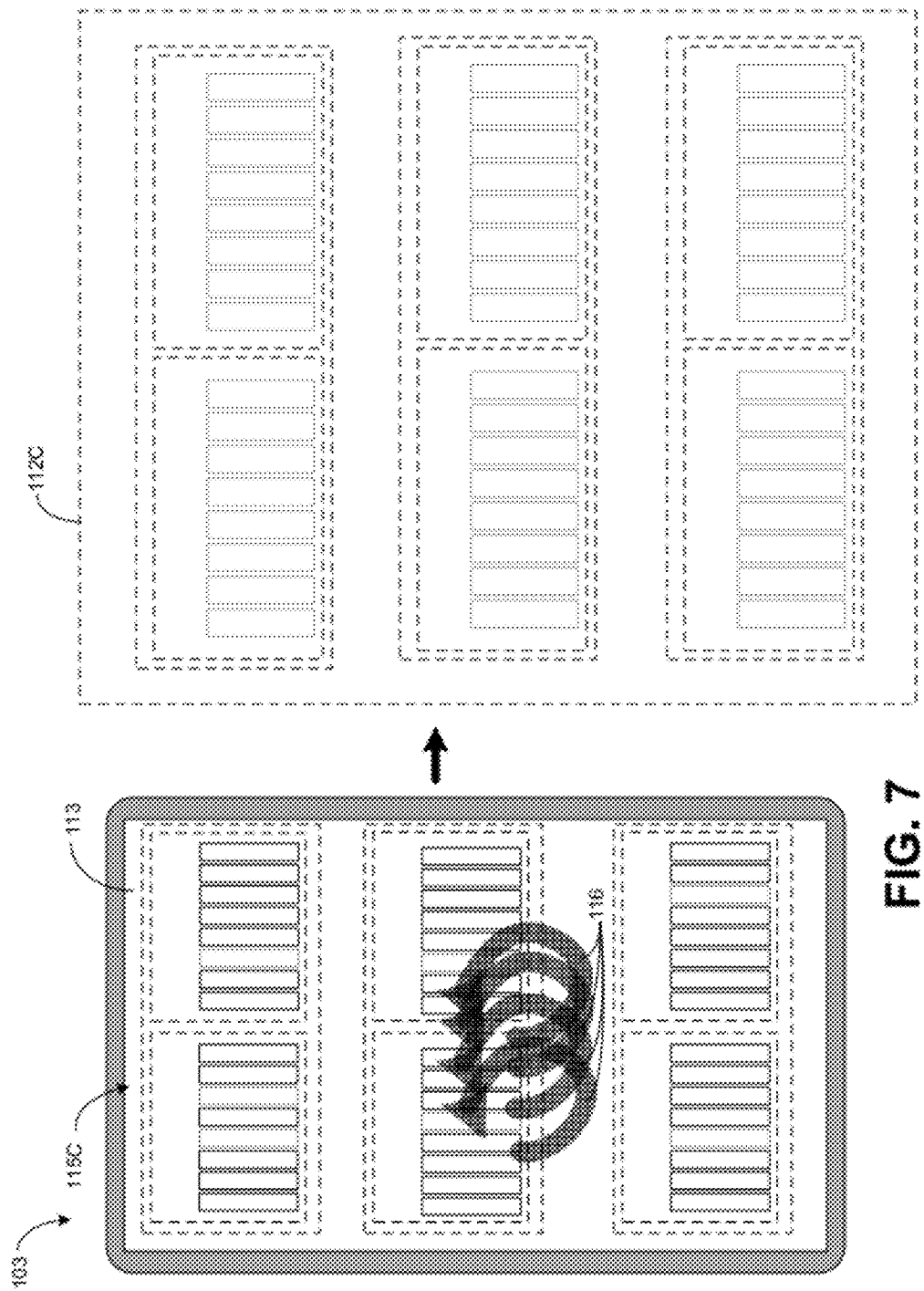
FIG. 7 depicts a user interface for detecting user inputs associated with control signals.

It will be recognized that operations 310-340 may be scaled to any multiplicity of user inputs (e.g. to user inputs involving from 3 to 10 fingers) associated with the control of any number of hierarchical grouping levels of controllable devices 101. For example, as shown in FIG. 6, upon receipt of three-finger user input 116 associated with UI element group 115B, the gesture-based input device 103 may provide one or more control signals 111 to cause all controllable devices 101 associated with the UI element group 115B (e.g. all controllable devices 101 within the server cluster group 112B) to power off. Similarly, as shown in FIG. 7, upon receipt of four-finger user input 116 associated with UI element group 115C, the gesture-based input device 103 may provide one or more control signals 111 to cause all controllable devices 101 associated with the UI element group 115C (e.g. all controllable devices 101 within the multi-cluster system group 112C) to power off.

The specific nature of the control signals 111 provided to the controllable devices 101 the resulting operations of those controllable devices 101 may be a function of the particular user movements associated with those user inputs.

For example, as shown in FIGS. 4-7, the user input 116 may trace an at least partially circular shape. Detection of such an at least partially circular user input 116 may cause the gesture-based input device 103 may provide one or more control signals 111 to one or more controllable devices 101 directing the controllable devices 101 to power off.

Figure 8:
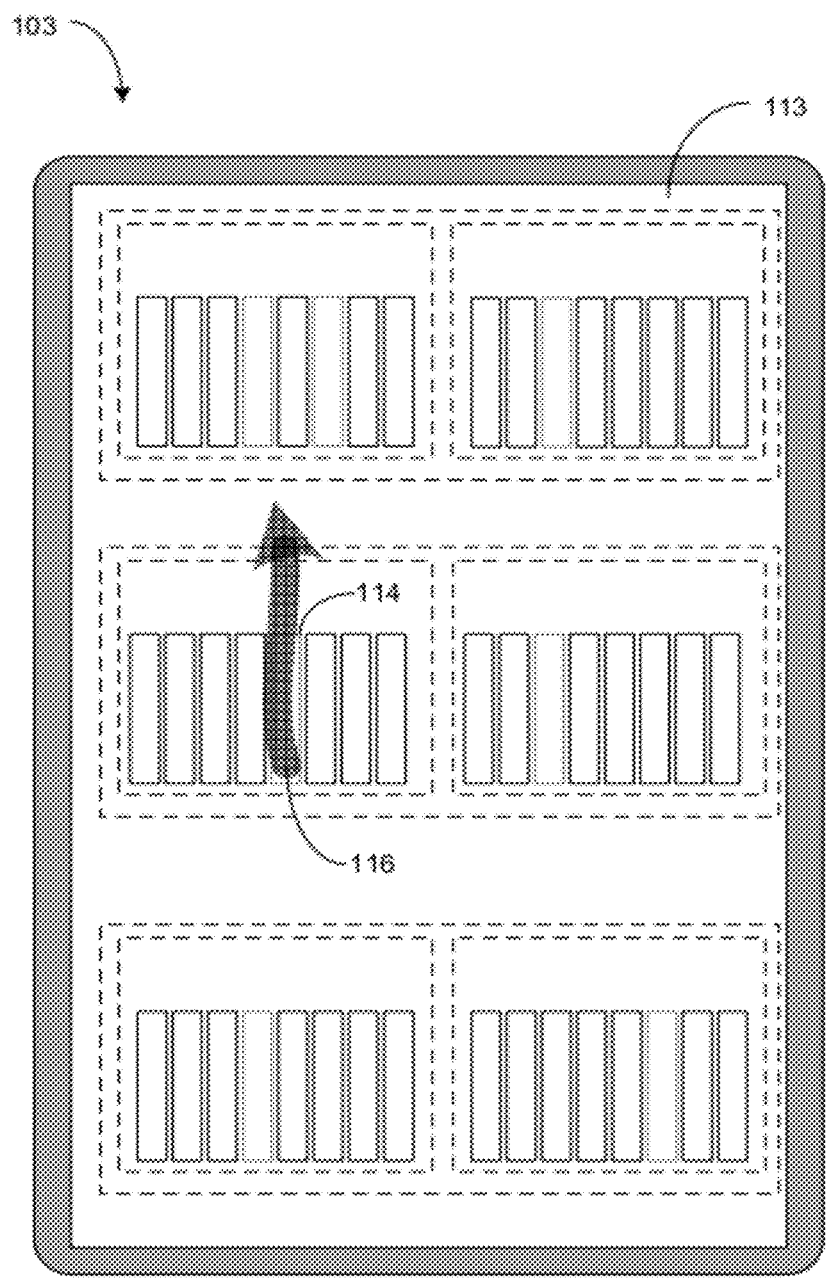
FIG. 8 depicts a user interface for detecting user inputs associated with control signals.

Still further, as shown in FIG. 8, the user input 116 may trace one or more substantially vertical linear shapes. Detection of such substantially vertical linear user inputs 116 may cause the gesture-based input device 103 may provide one or more control signals 111 to one or more controllable devices 101 directing the controllable devices 101 to power on. For example, as shown in FIG. 8, a substantially vertical single-touch user input 116 associated with a controllable device UI element 114 may be detected by the gesture-based input device 103 and one or more control signals may be transmitted to a controllable device 101 associated with the controllable device UI element 114 directing the controllable device 101 to power on.

Figure 9:
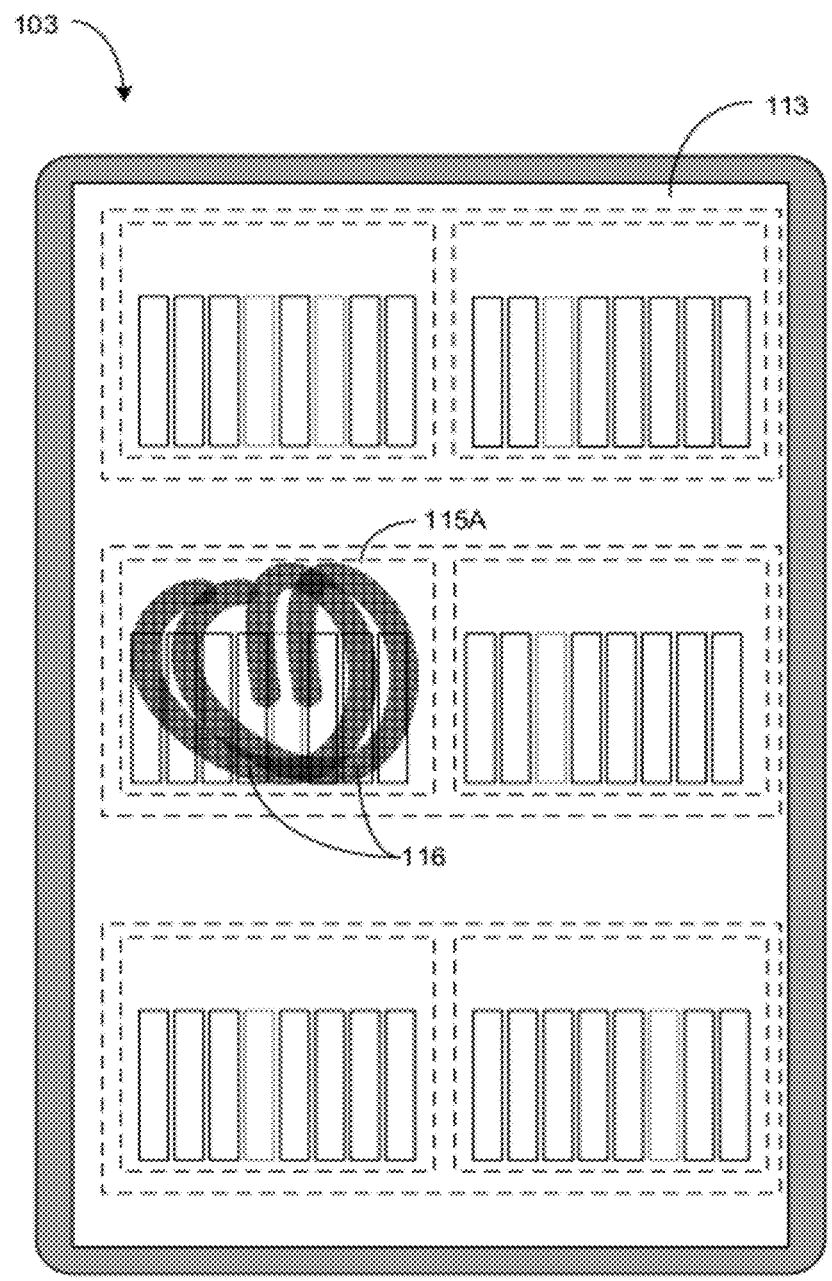
FIG. 9 depicts a user interface for detecting user inputs associated with control signals.

Still further, as shown in FIG. 9, the user input 116 may trace a substantially circular shape followed by a substantially vertical linear shape. Detection of a user input 116 including a substantially circular shape followed by a substantially vertical linear shape may cause the gesture-based input device 103 to provide one or more control signals 111 to one or more controllable devices 101 directing the controllable devices 101 to restart. For example, as shown in FIG. 9, a double-touch user input 116 characterized by a two substantially circular shapes followed by two substantially vertical linear shapes associated with a UI element group 115A may be detected by the gesture-based input device 103 and one or more control signals may be transmitted to all controllable devices 101 within a server chassis group 112A associated with the UI element group 115A directing all controllable devices 101 within the server chassis group 112A to restart (e.g. power off followed by power on).

Figure 10:
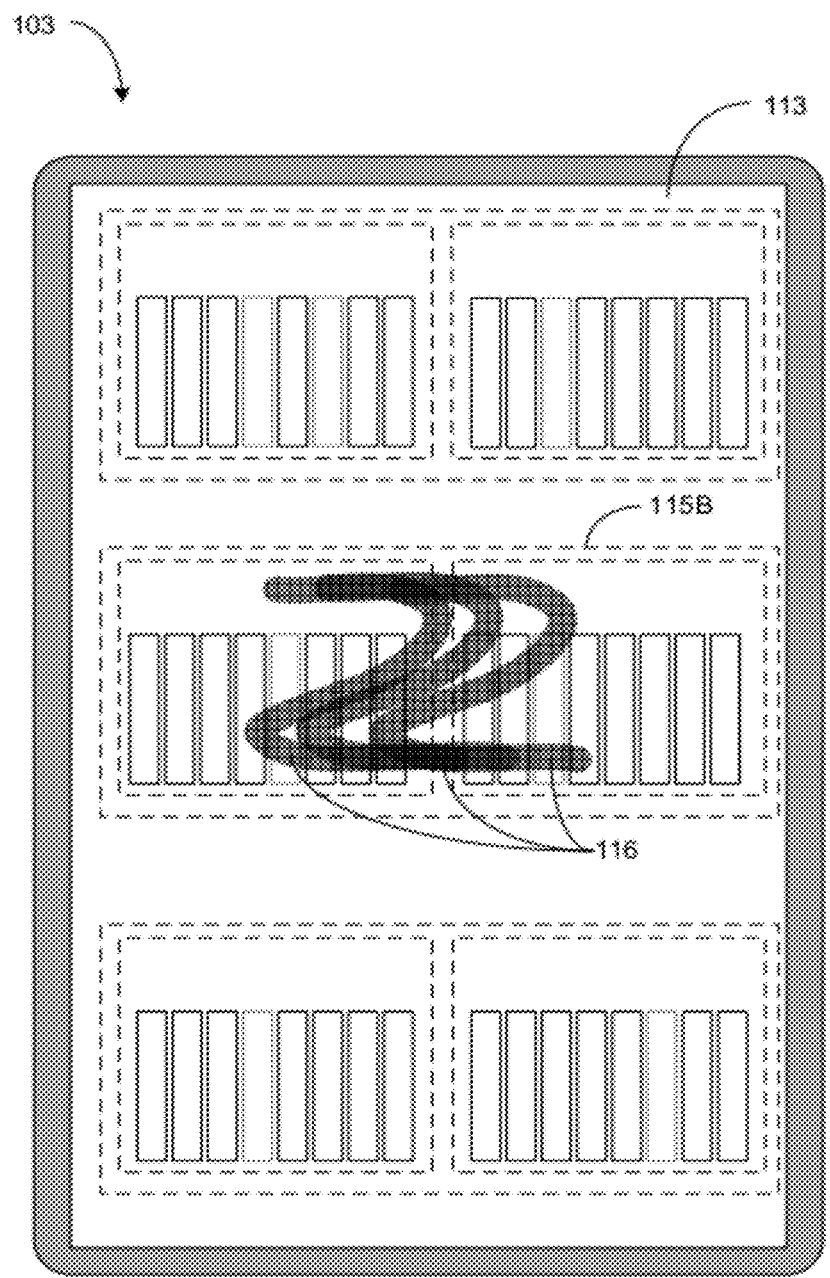
FIG. 10 depicts a user interface for detecting user inputs associated with control signals.

Still further, as shown in FIG. 10, the user input 116 may trace one or more substantially z-shaped inputs. Detection of one or more substantially z-shaped user inputs 116 may cause the gesture-based input device 103 provide one or more control signals 111 to one or more controllable devices 101 directing the controllable devices 101 to enter a sleep mode. For example, as shown in FIG. 10, a triple-touch user input 116 characterized by three z-shaped user inputs 116 associated with a UI element group 115B may be detected by the gesture-based input device 103 and one or more control signals may be transmitted to all controllable devices 101 within a server rack/cluster group 112B associated with the UI element group 115B directing all controllable devices 101 within the server rack/cluster group 112B to enter a sleep state.

Figure 11:
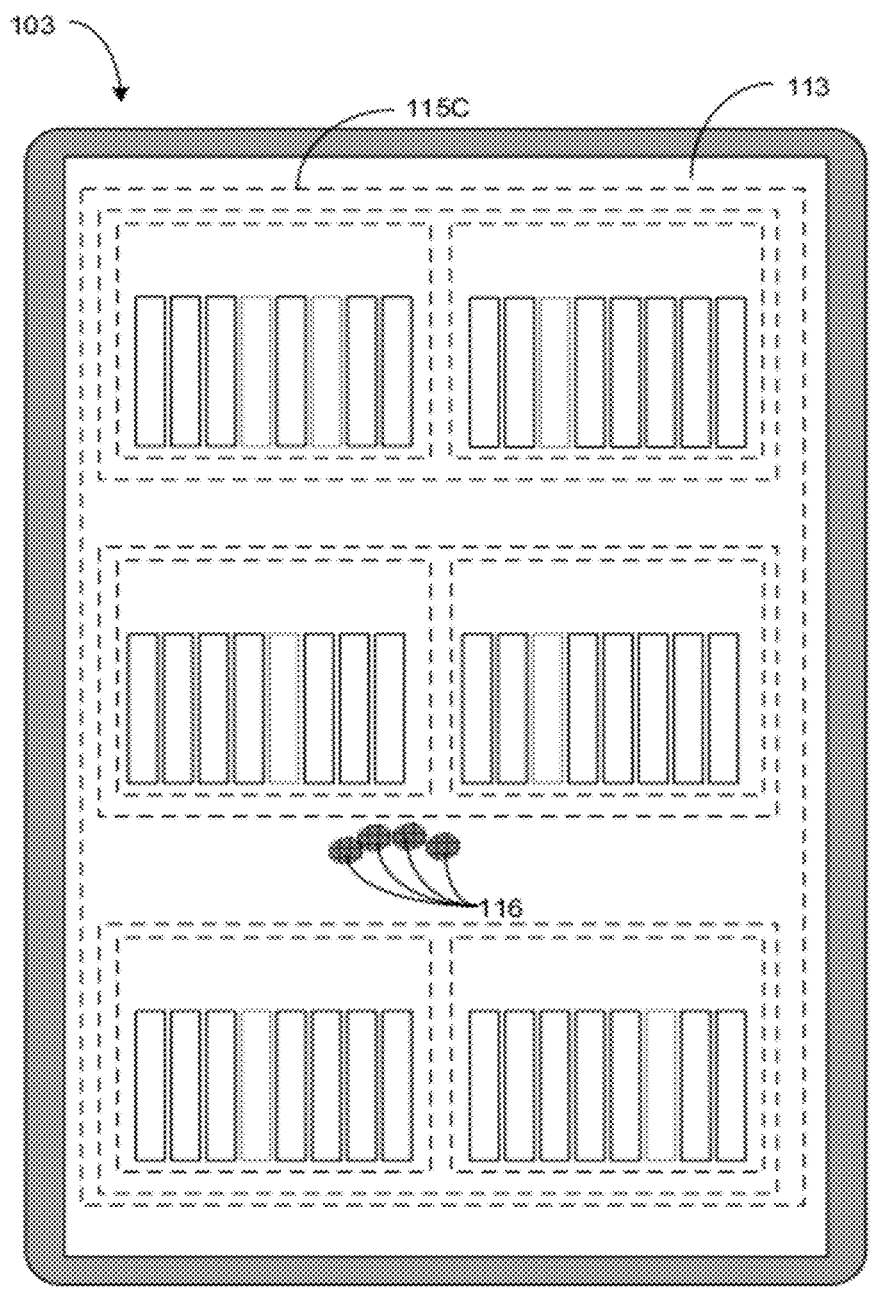
FIG. 11 depicts a user interface for detecting user inputs associated with control signals.
Figure 12:
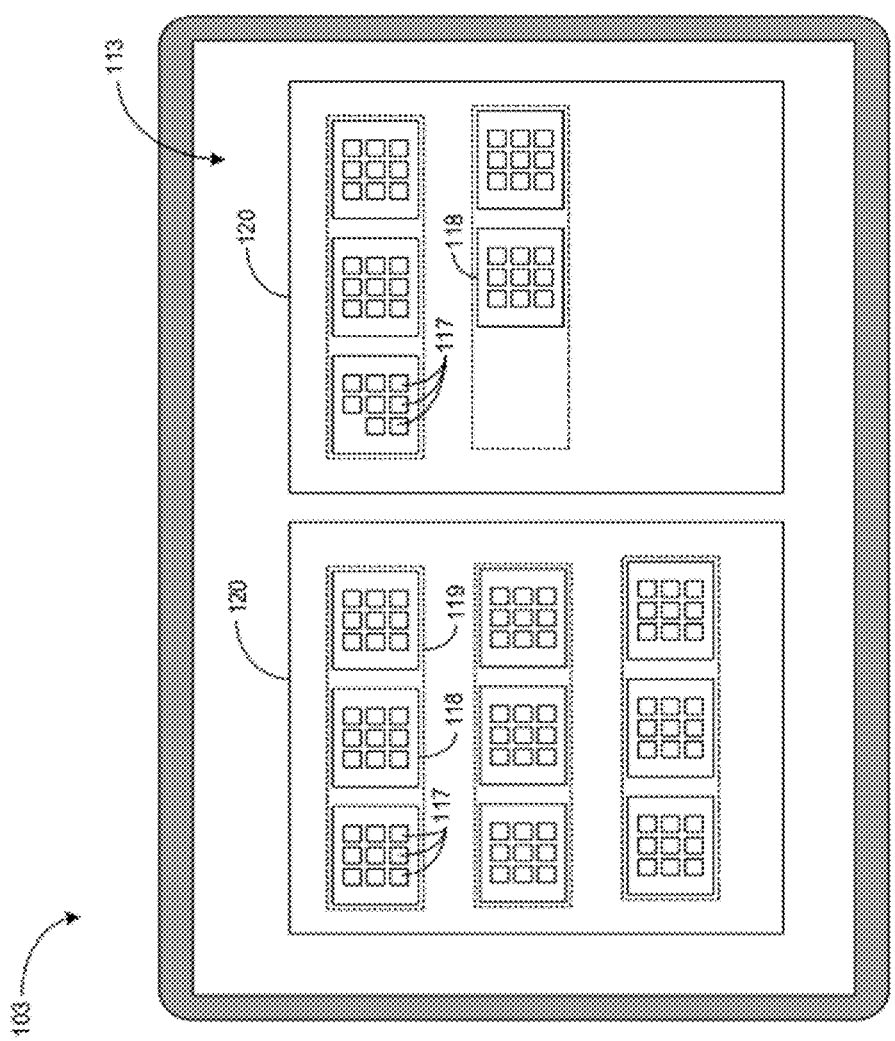
FIG. 12 depicts a user interface for detecting user inputs associated with shipping operations.

Still further, as shown in FIG. 11, the user input 116 may provide one or more triple-tap inputs. Detection of one or more triple-tap user inputs 116 may cause the gesture-based input device 103 provide one or more control signals 111 to one or more controllable devices 101 directing the controllable devices 101 to exit a sleep mode. For example, as shown in FIG. 11, a quadruple-touch, triple-tap user input 116 associated with a UI element group 115C may be detected by the gesture-based input device 103 and one or more control signals may be transmitted to all controllable devices 101 within a system group 112C associated with the UI element group 115C directing all controllable devices 101 within the system group 112C to exit a sleep mode.

In another example, single-touch, double-touch, triple touch and quadruple touch user inputs 116 may initiate help request operations for field level help, panel-level help, product-level help and solution-level help, respectively. For example, a user input 116 in the shape of a question mark (e.g. "?") and associated with a controllable device UI element 114 (or grouping thereof) may initiate a help request operation associated with a controllable device 101 associated with that controllable device UI element 114.

While previously described in the context of user interfaces configured to control one or more controllable devices, the above described systems and methods may be employed in any number of contexts without departing from the scope of the described invention. The above-described operations associated with the display of hierarchically grouped user interface elements and scalable user inputs associated therewith may be employed in the management of any data set having such a hierarchical distribution. For example, as shown in FIGS. 12-16, scalable user input methodologies employed by a gesture-based input device 103 may provide one or more control signals 111 associated with management of data associated with shipping operations. For example, a UI 113 may display one or more of a single item 117, a box 118 of the items 117, a palette 119 of the boxes 118, and a shipping container 120 of the palettes 119, respectively. Single-touch, double-touch, triple touch and/or quadruple touch user inputs 116 may initiate data management operations associated with items 117, boxes 118, palettes 119, and shipping containers 120, respectively. Specifically, such data management operations may include management of a shipment tracking database where data representing single items, boxes, palettes and shipping containers may be manipulated using the above described single and multi-touch inputs with respect to user interface elements representing those items, boxes, palettes and shipping containers. For example, data management operations may include, but are not limited to, adding (e.g. a "plus-sign" shaped gesture), removing (e.g. an "x" shaped gesture), transferring (e.g. a dragging gesture), and the like.

Figure 13:
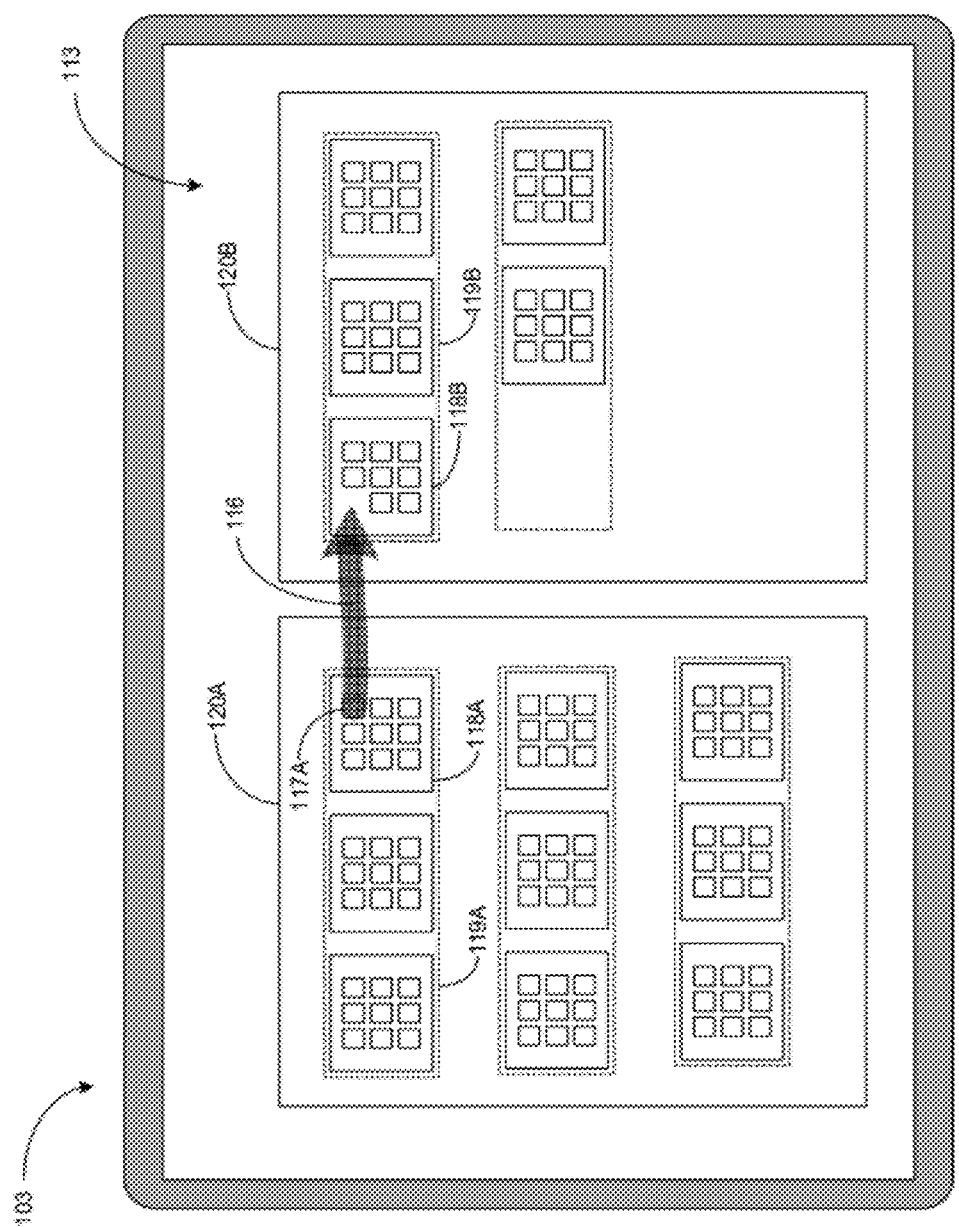
FIG. 13 depicts a user interface for detecting user inputs associated with shipping operations and control signals.

For example, as shown in FIG. 13, a single-touch user input 116 with a may trace a dragging gesture associated with an item 117A. Detection of such a dragging user input 116 may cause the gesture-based input device 103 to generate one or more control signals 111 to configure a shipping database maintained in the memory 108 of the gesture-based input device 103. For example, as shown in FIG. 13, a single-touch dragging gesture associated with an item 117A may transfer the item 117A from the box 118A of palette 119A of shipping container 120A to box 118B of palette 119B of shipping container 120B.

Figure 14:
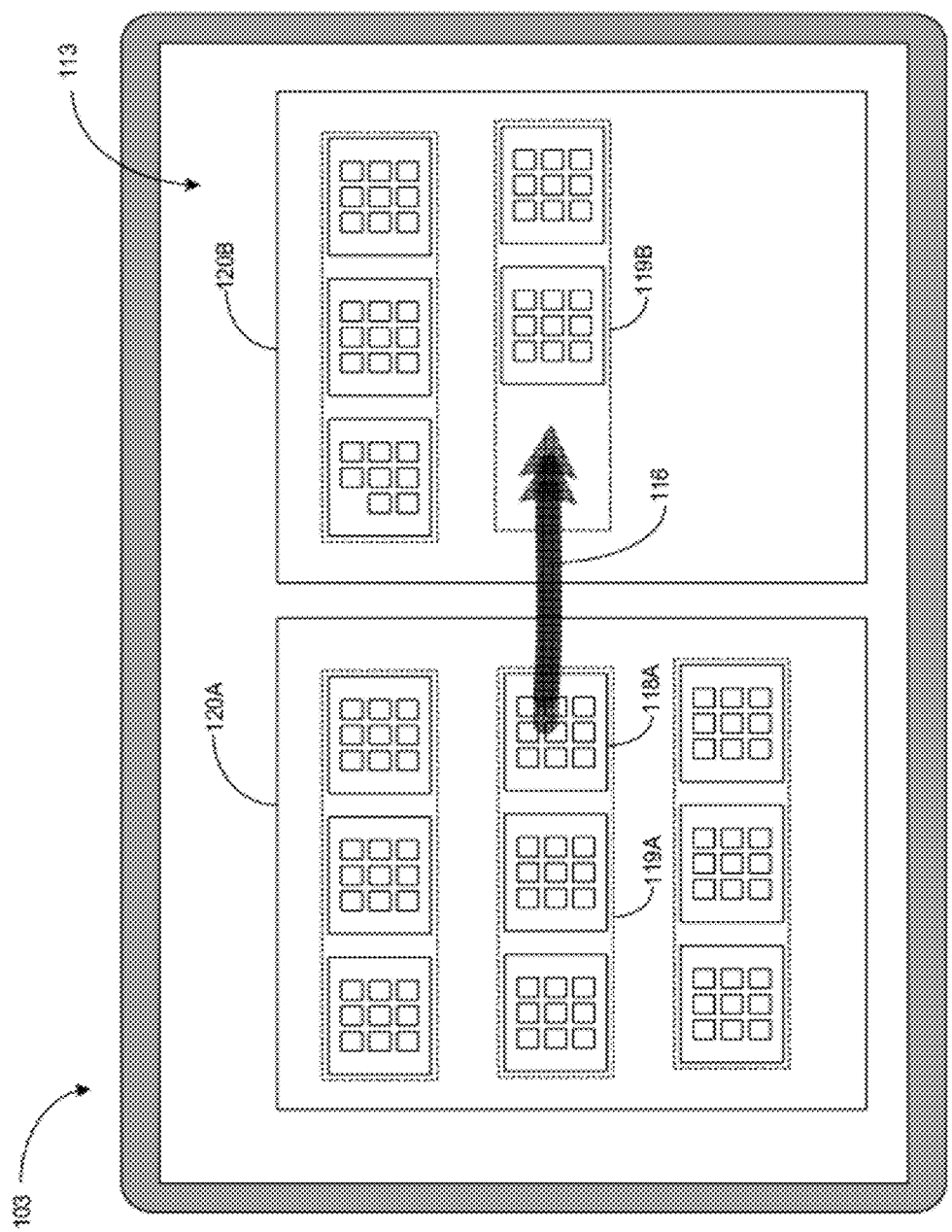
FIG. 14 depicts a user interface for detecting user inputs associated with shipping operations and control signals.

In another example, as shown in FIG. 14, a double-touch user input 116 may trace a dragging gesture associated with a box 118A. Detection of such a dragging user input 116 may cause the gesture-based input device 103 to generate one or more control signals 111 to configure a shipping database maintained in the memory 108 of the gesture-based input device 103. For example, as shown in FIG. 14, a double-touch dragging gesture associated with a box 118A may transfer the box 118A (and all items 117 associated therewith) from the palette 119A of shipping container 120A to palette 119B of shipping container 120B.

Figure 15:
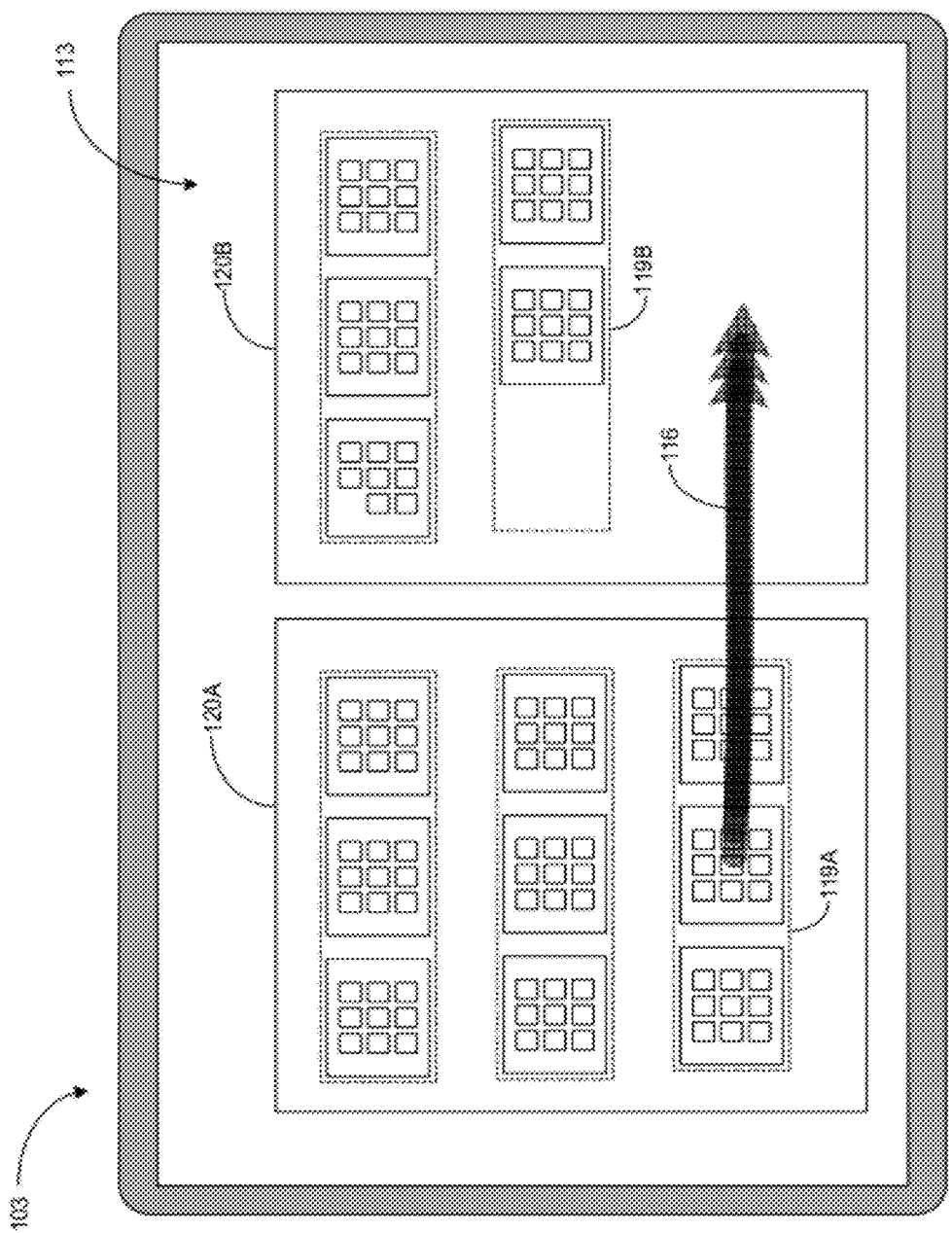
FIG. 15 depicts a user interface for detecting user inputs associated with shipping operations and control signals.

In another example, as shown in FIG. 15, a triple-touch user input 116 with a may trace a dragging gesture associated with a palette 119A. Detection of such a dragging user input 116 may cause the gesture-based input device 103 to generate one or more control signals 111 to configure a shipping database maintained in the memory 108 of the gesture-based input device 103. For example, as shown in FIG. 15, a triple-touch dragging gesture associated with a palette 119A may transfer the palette 119A (and all items 117 and boxes 118 associated therewith) from shipping container 120A to the shipping container 120B.

Figure 16:
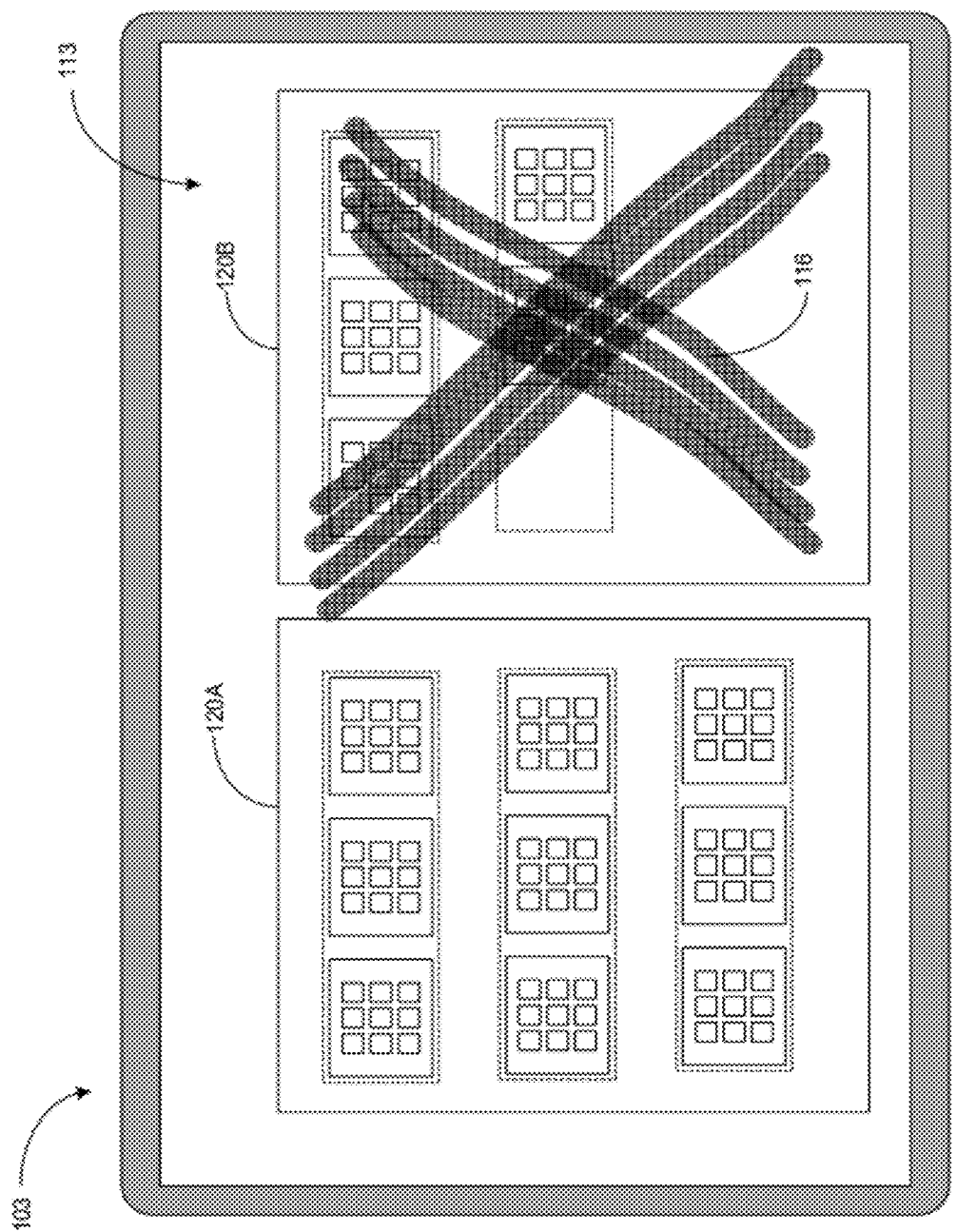
FIG. 16 depicts a user interface for detecting user inputs associated with shipping operations and control signals.

In another example, as shown in FIG. 16, a quadruple-touch user input 116 with may trace an "x"-shaped gesture associated with a shipping container 120B. Detection of such an "x"-shaped user input 116 may cause the gesture-based input device 103 to generate one or more control signals 111 to configure a shipping database maintained in the memory 108 of the gesture-based input device 103. For example, as shown in FIG. 16, the quadruple-touch "x"-shaped gesture associated with a shipping container 120B may remove shipping container 120B (and all items 117, boxes 118 and palettes 119 associated therewith) from the shipping database.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Although specific dependencies have been identified in the claims, it is to be noted that all possible combinations of the features of the claims are envisaged in the present application, and therefore the claims are to be interpreted to include all possible multiple dependencies. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for providing control signals comprising:
   detecting a single-touch user input associated with a first graphical user interface element, the first graphical user interface element associated with a first controllable device and a first hierarchical grouping level, the first hierarchical grouping level comprising the first graphical user interface element and the associated first controllable device;
   transmitting one or more control signals to the first controllable device to perform at least one device operation in response to the single-touch user input;
   detecting a multi-touch user input having a number of touches, the multi-touch user input being associated with a second hierarchical grouping level comprising at least a second graphical user interface element, the first graphical user interface element, and at least a second controllable device, wherein each graphical user interface element of the second hierarchical grouping level is associated with at least one controllable device of a grouping of controllable devices, the grouping of controllable devices including the first controllable device and the at least the second controllable device, and wherein the second hierarchical grouping level is any level in a hierarchical distribution equivalent to the number of touches; and
   transmitting one or more control signals to the grouping of controllable devices to perform at least one common device operation in response to the multi-touch user input,
   wherein each of the single-touch user input and the multi-touch user input include at least one gesture.

2. The method of claim 1, wherein the single-touch user input and the multi-touch user input are touch inputs to a touch-screen displaying the first graphical user interface element and the at least the second graphical user interface element.

3. The method of claim 1, wherein the multi-touch user input includes:
   at least one of a double-touch user input, a triple-touch user input, or a quadruple-touch user input.

4. The method of claim 1, wherein the first controllable device is a server device.

5. The method of claim 1, wherein the first controllable device and each controllable device of the grouping of controllable devices comprise a server device.

6. The method of claim 1, wherein the multi-touch user input is a first multi-touch user input, the method further comprising:
   detecting a second multi-touch user input having a second number of touches, the second multi-touch user input being associated with a third graphical user interface element of the hierarchical distribution, at least a third controllable device, at least a third hierarchical grouping level, and a second grouping of graphical user interface elements, each graphical user interface element of the second grouping of graphical user interface elements being associated with at least one controllable device from a second grouping of controllable devices including the at least the third controllable device, wherein the second number of touches is associated with any level of the hierarchical distribution equivalent to the second number of touches; and transmitting one or more control signals to the second grouping of controllable devices to perform the at least one common device operation in direct response to the second multi-touch user input.

7. The method of claim 6, wherein the at least the third hierarchical grouping level comprises the at least the third controllable device and the third graphical user interface element, and wherein the at least the third hierarchical grouping level resembles the second hierarchical grouping level at least in a type of controllable device and a type of graphical user interface element comprising the third hierarchical grouping level.

8. The method of claim 1, wherein at least one of the device operation or the at least one common device operation is selected from:

powering on, powering off, restarting, entering a sleep state, exiting a sleep state, throttling down, throttling up, adding data elements correlating to one or more objects to a database, removing data elements correlating to one or more objects from a database, or transferring data elements correlating to one or more objects from a first grouping of one more objects to a second grouping of one or more objects.

9. The method of claim 8, wherein the one or more objects include one or more shipping management objects.

10. The method of claim 6, further comprising:

detecting a third multi-touch user input having a third number of touches, the third multi-touch user input being associated with at least two groupings of graphical user interface elements and at least two groupings of controllable devices of the second hierarchical grouping level; and transmitting one or more control signals to each grouping of controllable devices corresponding to the at least two groupings of graphical user interface elements of the second hierarchical grouping level to perform at least one common device operation in direct response to the third multi-touch user input.

11. The method of claim 10, further comprising:

detecting a fourth multi-touch user input having a fourth number of touches, the fourth multi-touch user input being associated with all graphical user interface elements of the hierarchical distribution; and transmitting one or more control signals to all controllable devices to perform at least one common device operation in direct response to the fourth multi-touch user input.

12. The method of claim 3, wherein the double-touch user input corresponds to control of each device associated with the second hierarchical grouping level, the triple-touch user input corresponds to control of each device associated with a third hierarchical grouping level, or the quadruple-touch user input corresponds to control of each device associated with a fourth hierarchical grouping level.

13. The method of claim 1, wherein the second hierarchical grouping level is associated with at least one of: a server chassis group, a server rack/cluster group, or a system/data center group.

14. The method of claim 1, wherein transmitting one or more control signals to the grouping of controllable devices to perform at least one common device operation in response to the multi-touch user input comprises transmitting the one or more control signals to each controllable device of the grouping of controllable devices of the second hierarchical grouping level.

15. The method of claim 1, wherein transmitting one or more control signals to the grouping of controllable devices to perform at least one common device operation in response to the multi-touch user input comprises transmitting the one or more control signals to each controllable device of a system of controllable devices, wherein the system of controllable devices comprises all controllable devices associated with the hierarchical distribution.

16. A system for monitoring and/or controlling one or more controllable devices comprising:

one or more controllable devices;

a gesture-based input device, the gesture-based input device comprising a memory, a touch screen, a transceiver to communicate with the one or more controllable devices, and at least one processor programmed for:

detecting a single-touch user input associated with a first graphical user interface element, the first graphical user interface element associated with a first controllable device and a first hierarchical grouping level, the first hierarchical grouping level comprising the first graphical user interface element and the associated first controllable device;

transmitting one or more control signals to the first controllable device to perform at least one device operation in response to the single-touch user input;

detecting a multi-touch user input having a number of touches, the multi-touch user input being associated with a second hierarchical grouping level comprising at least a second graphical user interface element, the first graphical user interface element, and at least a second controllable device, wherein each graphical user interface element of the second hierarchical grouping level is associated with at least one controllable device of a grouping of controllable devices, the grouping of controllable devices including the first controllable device and the at least the second controllable device, and wherein the second hierarchical grouping level is any level in a hierarchical distribution equivalent to the number of touches; and transmitting one or more control signals to the controllable devices of the grouping of controllable devices to perform at least one common device operation in response to the multi-touch user input, wherein each of the single-touch user input and the multi-touch user input include at least one gesture associated with the at least one common device operation.

17. The system of claim 16, wherein the one or more control signals transmitted are associated with at least one of: powering off one or more devices, powering on one or more devices, restarting one or more devices, causing one or more devices to enter a sleep mode, causing one or more devices to exit a sleep mode, a help request operation, adding data elements correlating to one or more objects to a database, removing data elements correlating to one or more objects from a database, or transferring data elements correlating to one or more objects from a first grouping of one more objects to a second grouping of one or more objects.

18. The system of claim 16, wherein the multi-touch user input includes:

at least one of a double-touch user input, a triple-touch user input, or a quadruple-touch user input.

19. The system of claim 18, wherein the double-touch user input is associated with control of each device in the second hierarchical grouping level, the triple-touch user input is associated with control of each device in a third hierarchical grouping level, or the quadruple-touch user input is associated with control of each device in a fourth hierarchical grouping level.

20. The system of claim 16, wherein the second hierarchical grouping level is associated with at least one of: a server chassis group, a server rack/cluster group, or a system/data center group.

* * * * *